Nov. 13, 1934.  F. H. OWENS  1,980,223
LIGHT VALVE FOR TRANSLATION OF SOUND EFFECTS
Filed Sept. 17, 1928
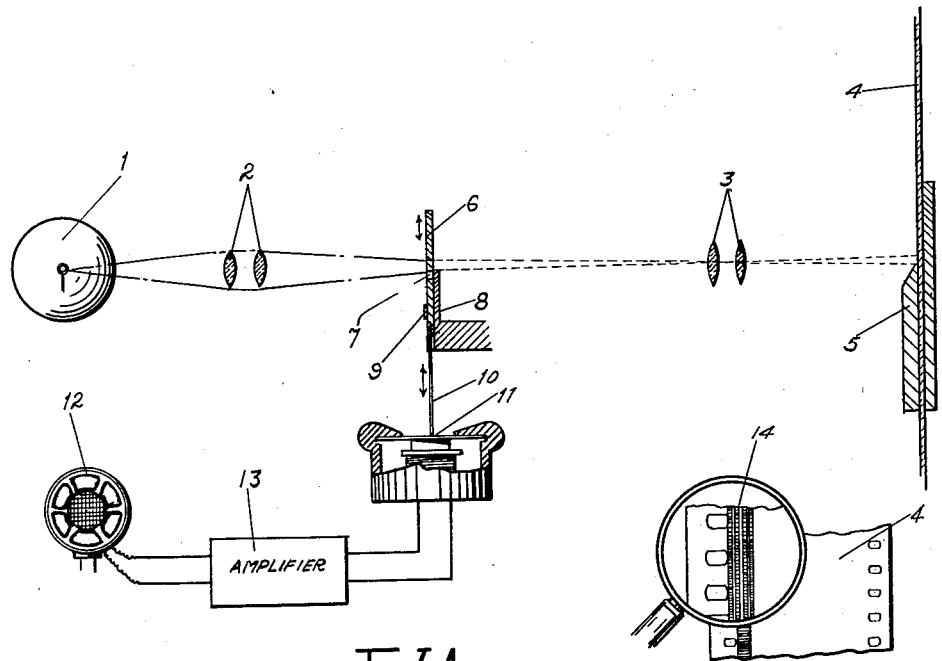
Fig. 1.
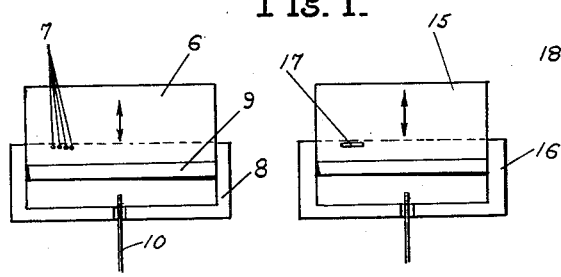
Fig. 2.   Fig. 3.
Fig. 4.
Fig. 5.
INVENTOR.
FREEMAN H. OWENS.
BY John B. Brady
ATTORNEY Patented Nov. 13, 1934

1,980,223

UNITED STATES PATENT OFFICE 1,980,223

LIGHT VALVE FOR TRANSLATION OF SOUND EFFECTS

Freeman H. Owens, New York, N. Y., assignor to Wired Radio, Inc., New York, N. Y., a corporation of Delaware Application September 17, 1928, Serial No. 306,497

9 Claims. (Cl. 274—5)

My invention relates generally to a means and method for recording photographic sound records and has for its primary object the provision of means for recording sound on a photographic sensitive film by the use of a light of constant intensity and a sound controlled variable slit through which the light passes to the film.

Another object of my invention is to provide a novel form of slit member or light valve for this purpose.

Other objects and advantages will be apparent as the description proceeds, reference now being had to the figures of the accompanying drawing forming a part of this application, and wherein like reference numerals indicate like parts.

In the drawing:

Figure 1 is a diagrammatic illustration of my invention, certain parts being shown in section for clearness.

Figure 2 is a front view of one form of slit device used in my invention.

Figure 3 is a front view of another type of slit device which may be used.

Figure 4 is a detail view of a section of film showing the sound record recorded thereon by using the slit device shown in Figure 2.

Figure 5 is a detail view of a section of film showing the sound record recorded thereon by use of the slit shown in Figure 3.

In carrying out my invention, I use a light source, such as the lamp 1 of constant intensity, the rays of which pass through lenses 2 and then to a variable slit device to be described. The light rays passing through the slit to the lenses 3 are focused upon the photographic sensitive film 4 passing through a suitable film gate 5. The film 4 is of course adapted to be moved through the gate 5 by any suitable film moving means.

The variable slit member comprises a plate or slide 6 provided, in the form shown in Figure 2, with a plurality of small openings 7 forming a slit through which the light rays from the lamp 1 may pass. A fixed plate 8 acts as a guide for the slide 6 and a strap 9 serves as a further guide for this movable slit member 6.

The lower end of the plate 6 has a pin connection 10 with a diaphragm 11, vibration of which is produced in any suitable manner by sound, such as for instance, through the means of a microphone 12 whereby the sound waves are converted to electric impulses, amplified by any suitable amplifying device 13 and then transmitted to the diaphragm 11.

It will be observed with respect to Figure 1 that normally the slide 6 is so positioned that the slit or opening 7 lies just below the upper edge of the guide plate 8, thereby cutting off the light from the lamp 1 to the film. When, however, the diaphragm 11 is vibrated, this slide 6 will be oscillated vertically and such oscillations will raise the openings 7 above the upper edge of the fixed guide plate 8 to pass the light rays in variable amounts. Obviously, the variation in the amount of light passing through the openings 7 to the film 4 will be governed directly by the vibration of the diaphragm. I have shown in Figure 1 in dotted lines the light rays passing through the openings 7 when the same are raised to their full diameter above the upper edge of the guide plate 8. The upper edge of openings 7 and the upper edge of the guide plate 8 thus define the slit, the size of which is variable by the sound controlled oscillations of the plate 6.

In the use of the slit device shown in Figure 2, that is with the plurality of adjacent holes or openings 7, the light rays passing therethrough to the film 4 will be in the form of adjacent parallel beams of light, one for each opening 7, resulting in the photographing on the film 4 of a sound record consisting of an exposed band comprising adjacent and parallel rows of light exposures, one row for each opening 7. This type of sound record is clearly shown in Figure 4 at 14. If desired, however, a slit member 15, may be used, such as shown in Figure 3, comprising the stationary guide 16 for the slidable member 15, and the latter having a small rectangular opening or slit 17 therein for variable adjustments in cooperation with the upper edge of the stationary guide 16. The use of this type of slit will result in a sound record of the usual form such as shown at 18 in Figure 5.

It will be noted that the fixed guide plate 8, the upper edge of which acts as the lower edge of the slit through which the light passes, defines and fixes the path of the light passing through the slit to the film, 4. It is, therefore, necessary that the film gate 5 through which the film passes, need block off the light rays from the slit on one side only in order to accommodate the side of the light rays which is variable by means of the slit member 6. The advantage of this lies in the fact that a considerable surface of the film gate through which the film moves can be eliminated, thus reducing the friction on the film in its passage through the gate. Furthermore, the need is eliminated for a very narrow light slit adjacent the film. Hence, an annoying difficulty is removed, namely, that of keeping such a light slit clear of obstructions from accumulations of dirt.

Of course, changes may be made in details of construction and arrangement, without departing from the spirit and scope of my invention. I do not limit myself, therefore, to the exact form herein shown and described, other than by the appended claims.

I claim:—

1. Means for photographically recording vibrations, comprising a light source of constant intensity, a fixed guide plate, a movable plate provided with a plurality of openings co-operating with one edge of said fixed plate to form a variable slit through which the light from said source may pass to a sensitive film, means for actuating said movable plate in accordance with the vibrations to be recorded, a film and means including a film gate having a screening member only one edge of which is in the line of light from said source for delimiting the exposure area of said film in a direction opposed to that which is defined by said fixed plate.

2. In photographic sound recording apparatus, a film, a light valve having a stationary light obstructing member, past one edge of which light may be projected onto a light-sensitive film, a movable member responsive to vibrations in accordance with sound waves, said movable member having a plurality of apertures cooperating with and adjacent the said edge of the stationary member, and arranged upon being set into vibration to admit light beams to said film of variable cross-sectional area where restricted by said members, and means including a film-gate with a single sharp-edged screening member disposed transversely of said film for screening said film from a portion of said light beams.

3. Photographic sound recording apparatus comprising a light valve having a vibratory member responsive to electrical impulses in accordance with sound vibrations, said member having a plurality of apertures therein, a stationary light obstructing member cooperating with said member and the apertures therein, to form a plurality of variable light beams, a film, and a film-gate having means including a sharp-edged screening member for limiting in one direction the exposure of said film to light beams projected through said light valve while said stationary light obstructing member limits in the opposite direction the exposure of said film to said light beams.

4. In photographic sound recording apparatus, a film, a film gate therefor comprising means including a sharp edged member the edge of which extends laterally across and adjacent said film for delimiting the area of exposure of said film in one direction only, a light-valve comprising a fixed plate and a movable plate, one of said plates being operable adjacent an edge of the other of said plates, the two said plates forming in cooperation means to admit light beams variable in cross-sectional area in accordance with the sound vibrations to be recorded, and means including an optical system interposed between the fixed plate of said light-valve and the sharp-edged member of said film-gate for causing the effective exposure area of said film to said light beams to be limited in an opposite sense by said fixed plate and by said sharp-edged member respectively.

5. In photographic sound recording apparatus, the combination of a fixed source of light, a light valve comprising fixed and vibratory plates, an optical system and a film-gate adjacent the film to be exposed, the fixed plate and the film-gate cooperating to define a sharp line of light to which said film is exposable and said vibratory plate comprising means for varying the intensity of the line of light as projected on said film.

6. Apparatus in accordance with claim 5 in which the vibratory plate is orificed so as to form a plurality of sound tracks upon said film, each track being a record similar to that of the others and being of variable density.

7. In a sound recording camera, a constant source of light, a sensitized film, optical means for directing and reversing beams of light from said source against said film, two stationary screening members adapted to cast shadows on opposite sides of said beams of light for restricting the instantaneous exposure area of said film to said beams, one of said screening members being adjacent said film and the other of said screening members being disposed between said source of light and said optical means and a vibratory plate adjacent the last said screening member and cooperating therewith to admit light beams of variable intensity for exposing said film.

8. In a sound recording camera, a sensitized film, a constant source of light, means for optically directing said light in a thin beam upon said film and vibrating means for varying the thickness of said beam as it impinges upon said film whereby a variable density sound record is obtained, said vibratory means having in cooperation therewith a stationary screening member one edge of which delimits the light beam in one direction longitudinally of said film and said film having disposed adjacent thereto a second screening member for delimiting said light beam in the opposite direction from that effected by the first said screening member.

9. In a sound recording camera, a constant source of light, a sensitized film and interposed therebetween a light valve comprising means for varying the intensity of the light rays impinging upon said film, an optical system between said light valve and said film, said light valve including a stationary screening member having a sharp edge adapted to cast a shadow across the sound track of said film, and a film gate provided with a sharp edged screening member adapted to cast a second shadow across the sound track of said film, said sound track being exposable to light rays between the two said shadows only.

FREEMAN H. OWENS.